Reissued May 13, 1930

Re. 17,661

UNITED STATES PATENT OFFICE

RICHARD H. MARTIN, OF WORCESTER, MASSACHUSETTS, ASSIGNOR TO NORTON COMPANY, OF WORCESTER, MASSACHUSETTS, A CORPORATION OF MASSACHUSETTS

REFRACTORY ARTICLE AND METHOD OF PROTECTING THE SAME

No Drawing. Original No. 1,653,918, dated December 27, 1927, Serial No. 24,277, filed April 18, 1925. Application for reissue filed May 21, 1929. Serial No. 364,939.

This invention relates to refractory articles, such as bricks, saggers and the like, containing silicon carbide, and more particularly the invention relates to the provision of certain expedients for protecting such articles and thereby preventing their decomposition.

While refractory articles containing silicon carbide have many characteristic advantages for certain purposes due to their mechanical strength, heat conductivity and resistance to sudden temperature changes, nevertheless, they are objectionable because of their tendency to decompose under ordinary ceramic operating conditions.

Decomposition of a silicon carbide article is due generally to oxidation of the silicon carbide which begins at about 600° C. and takes place very rapidly at temperatures from about 900° C. to about 1100° C. Such decomposition in a brick or the like materially shortens its life and makes an early replacement necessary.

When ceramic materials and especially the finer wares, such as white ware, china, porcelain, and the like are fired in close proximity to saggers or refractories containing silicon carbide, it has been found that there may be an objectionable blackening or discoloration of the white or light colored ware due to decomposition of the silicon carbide employed.

It is the object of the present invention to provide a composition for and method of coating refractory silicon carbide articles as well as an improved refractory silicon carbide article which is resistant to decomposition under ordinary kiln operating conditions.

In accordance with the invention, I provide a composition containing a magnesium compound, such as magnesia, for coating refractory articles containing silicon carbide which may be applied to the article in any appropriate manner, such for example as by mixing with water or the like, to form a liquid mixture of about the consistency of cream which is sprayed or painted upon the article. If desired, the article may be dipped into such a mixture and covered therewith. Articles thus covered may be fired in an appropriate manner to convert the covering to a glaze or coating which is dense and substantially impervious to kiln gases under normal operating conditions.

The coating composition of the invention is composed either wholly or in part, of a magnesium compound, such as magnesia. The magnesium compound may be mixed with one or more of other carefully selected ingredients and compounded therewith so as to fuse, when applied on a refractory silicon carbide article and appropriately heated, to form a glaze or coating which will protect the refractory article and substantially prevent decomposition of the silicon carbide therein. Thus, the magnesium compound, such as magnesia, may be intimately mixed with another appropriate agent, such as alumina, silica, ferric oxide, chromic oxide, and the like, the amount and character of which is so chosen as to form with the magnesium compound, when applied on the refractory article and appropriately fired, a dense mass substantially impervious to kiln gases under normal operating conditions. If magnesia is used alone the silica or other ingredients present as impurities in the magnesia, or the silica derived by decomposition of the silicon carbide, or both, serve to form with the magnesia the substantially impervious coating.

The coating composition is of such nature as will permit penetration of the kiln gases during firing of the article until the coating has become properly fused. This penetration of the gases causes a partial decomposition of the surface portions of the silicon carbide article resulting in the formation of silica which becomes an integral part of the coating and results in or assists in the provision of the desired dense substantially gas impervious coating or glaze. It will be apparent that refractory materials, such as clays or zirconium oxide either pure or impure, may be incorporated in the coating composition in an amount properly proportioned with respect to the other ingredients so that the mixture will be capable, when applied on a refractory silicon carbide article and appropriately fired, of forming a dense coating or glaze substantially impervious to kiln gases under normal operating conditions.

In the practice of the invention in general, the ingredients of the coating composition should be ground to a very finely divided condition and may be ground separately or mixed together in a substantially powdered form and ground while either wet or dry. Very satisfactory results are obtained in some cases when the coating composition is ground to a substantially colloidal condition or to such a fine degree of subdivision as to have properties similar to colloids.

The ingredients thus prepared are mixed with water or the like to form a slip of about the consistency of cream or that of a good paint. The refractory article, such as a brick, sagger, or the like, containing silicon carbide, is then coated with the mixture by spraying or painting thereon. The article thus covered is placed in a kiln and appropriately fired at about Orton cone 16, thereby producing a glaze or coating on the article which is substantially impervious to the kiln gases under normal operating conditions. In some cases, it may be advisable to heat a powdered mixture of the ingredients to a temperature of about 1500° C. and then regrind before mixing with water to form a slip.

The invention will be illustrated further by the following specific examples of its practice.

*Example 1*

A refractory coating composition may be made up by mixing 90% by weight of magnesia having a grain size of 100F (100 meshes to the linear inch and finer) with 10% by weight of powdered ferric oxide. This mixture is made into a slip by the addition of an appropriate amount of water to form a liquid mixture of about the consistency of cream, and painted upon a refractory silicon carbide article. The article thus covered is then fired at about Orton cone 16 to form a relatively dense coating thereon which is substantially impervious to kiln gases under ordinary operating conditions.

*Example 2*

A coating composition may be prepared by mixing 21% by weight of magnesia having a grain size of 150F (150 meshes to the linear inch and finer) with 79% by weight of very finely divided zirkite cement (impure zirconium oxide) whose particles are such as to resemble colloids both in size and properties. The refractory mixture is then heated to 1500° C., reground to 120F and made into a slip by the addition of an appropriate amount of water to form a liquid mixture of about the consistency of cream, and painted on a refractory silicon carbide article. The article thus covered is fired at about Orton cone 16 to form a relatively dense coating thereon which is substantially impervious to kiln gases under normal operating conditions.

The zirkite cement employed in the above coating composition is an impure zirconium oxide ($ZrO_2$) having substantially the following composition:

| | Per cent |
|---|---|
| $SiO_2$ | 20.8 |
| $Al_2O_3$ | 2.01 |
| $Fe_2O_3$ | 3.86 |
| $TiO_2$ | 0.82 |
| $ZrO_2$ | 70.9 |
| CaO | 0.10 |
| MgO | Trace |
| Loss on ignition | 2.17 |

*Example 3*

A refractory mixture may be made up containing 50% by weight of magnesia having a grain size of 150F together with 50% by weight of alumina in a substantially pure form containing only a very small amount of alkali and other impurities and having a grain size of 120 meshes to the linear inch. This refractory mixture is made into a slip by the addition of an appropriate amount of water to form a liquid mixture of about the consistency of cream, and painted upon a refractory silicon carbide article. The article thus covered is then fired at about Orton cone 16 to form a relatively dense coating thereon. This coating is substantially impervious to kiln gases under ordinary operating conditions and satisfactorily protects the silicon carbide article from decomposition.

*Example 4*

A coating composition may be prepared by mixing a synthetic forsterite mixture with about 5% by weight of powdered chromic oxide ($Cr_2O_3$). The forsterite mixture is prepared by mixing about 67.4% by weight of 150F magnesia with about 32.6% by weight of flint. The composition containing the forsterite mixture and chromic oxide is then made into a slip by the addition of an appropriate amount of water to form a liquid mixture of about the consistency of cream, and painted upon a refractory silicon carbide article. The thus covered article is then fired at about Orton cone 16 to form a dense coating thereon which is substantially impervious to kiln gases under normal operating conditions.

Throughout this specification and the appended claims, I intend that the expression "fluxing agent" and "fluxing ingredient" should be interpreted as including such materials as ferric oxide, chromic oxide, alumina, silica, or other materials having a similar effect on fusibility of the essentially magnesium composition. These materials may be purposely added as such to the coating mixture, or they may be present as impurities of one or more ingredients of the composition, or they may be supplied thereto as products of the decomposition of the silicon carbide article.

Having thus described my invention, what I claim as new and desire to secure by Letters Patent is:

1. The method of forming a protective coating on a refractory article containing silicon carbide which comprises covering the article with a composition composed in large part of a magnesium compound, and thereafter appropriately firing the article to form a dense coating thereon substantially impervious to kiln gases under normal operating conditions.

2. The method of forming a protective coating on a refractory article containing silicon carbide which comprises covering the article with a composition composed in large part of a magnesium compound and containing a fluxing agent, and thereafter appropriately firing the article to form a dense coating thereon substantially impervious to kiln gases under normal operating conditions.

3. The method of forming a protective coating on a refractory article containing silicon carbide which comprises covering the article with a composition composed in large part of magnesia, and thereafter appropriately firing the article to form a dense coating thereon substantially impervious to kiln gases under normal operating conditions.

4. The method of forming a protective coating on a refractory article containing silicon carbide which comprises covering the article with a composition composed in large part of magnesia and containing a fluxing agent, and thereafter appropriately firing the article to form a dense coating thereon substantially impervious to kiln gases under normal operating conditions.

5. The method of forming a protective coating on a refractory article containing silicon carbide which comprises covering the article with a composition composed in large part of magnesia and containing ferric oxide, and thereafter appropriately firing the article to form a dense coating thereon substantially impervious to kiln gases under normal operating conditions.

6. A refractory article comprising a body containing silicon carbide and a protective coating thereover composed in large part of a magnesium compound, said protective coating being substantially impervious to kiln gases under normal operating conditions.

7. A refractory article comprising a body containing silicon carbide and a protective coating thereover composed in large part of a magnesium compound fused with a fluxing agent, said protective coating being substantially impervious to kiln gases under normal operating conditions.

8. A refractory article comprising a body containing silicon carbide and a protective coating thereover containing magnesia and ferric oxide, said protective coating being substantially impervious to kiln gases under normal operating conditions.

9. A refractory article comprising a body of bonded refractory grains and a relatively thin protective coating thereover and bonded thereto composed in large part of magnesium compound, said protective coating being substantially impervious to kiln gases under normal operating conditions.

10. A refractory article comprising a body of bonded refractory grains and a relatively thin protective coating thereover and bonded thereto composed in large part of magnesium compound fused with a fluxing agent, said protective coating being substantially impervious to kiln gases under normal operating conditions.

11. A refractory article comprising a body of bonded refractory grains and a relatively thin protective coating thereover and bonded thereto containing magnesia and ferric oxide, said protective coating being substantially impervious to kiln gases under normal operating conditions.

RICHARD H. MARTIN.